April 12, 1949.  F. H. RICE  2,466,912
WIRE OR CONDUIT CLIP
Filed July 4, 1944

Inventor
Frederick H. Rice
By R. S. Berri
Attorney

Patented Apr. 12, 1949

2,466,912

UNITED STATES PATENT OFFICE 2,466,912

WIRE OR CONDUIT CLIP

Frederick Henry Rice, Hollywood, Calif., assignor, by mesne assignments, to Tinnerman Products, Inc., Cleveland, Ohio, a corporation of Ohio Application July 4, 1944, Serial No. 543,452

1 Claim. (Cl. 248—74)

This invention relates to spring clips which are adapted to embrace and support wires or conduits, particularly in aircraft, for the purpose of anchoring wires or conduits to structural parts past or adjacent which the wires or conduits are extended.

It is the primary object of this invention to provide a clip of the character discribed which is comparatively light, simple as to construction, may be quickly and easily applied to and removed from wires or conduits before or after being fastened to a support such as the frame structure of an aircraft, and may be locked around the wires or conduits before or after fastening the clip on the support.

Another object of my invention is to provide a clip such as described in which a locking hook is struck out as a spring tongue from a part of the metal strap body of the clip at a point spaced inwardly of a fastening-receiving opening formed in one end of the clip, for hooking the other end of the clip, to lock it around the wires or conduits before or after the clip is fastened to a support, the hook and said other end being constructed and arranged so that on bringing the ends of the clip together to embrace the wires or a conduit, the hook may be readily and easily hooked into any one of several openings whereby the clip may be clamped around bundles of wires or conduits of different diameters.

A further object of my invention is to provide a clip of the character described in which the ends thereof may be securely locked together against accidental release, upon the movement of the end having the hook-receiving opening therein under the hook and releasing said end whereby it will snap outwardly and become hooked to said hook.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Figure 1:
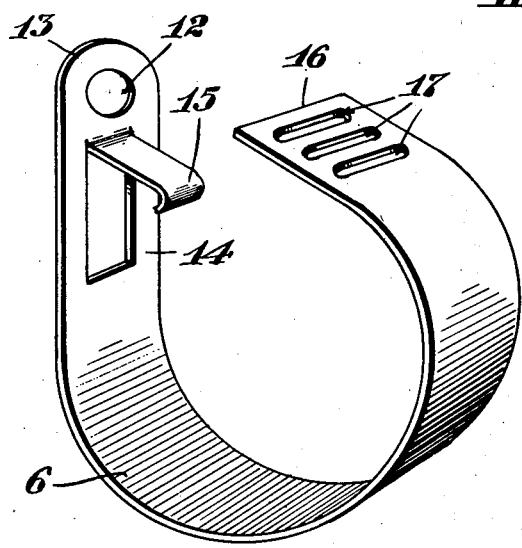
Fig. 1 is a perspective view of a clip embodying my invention.
Figure 2:
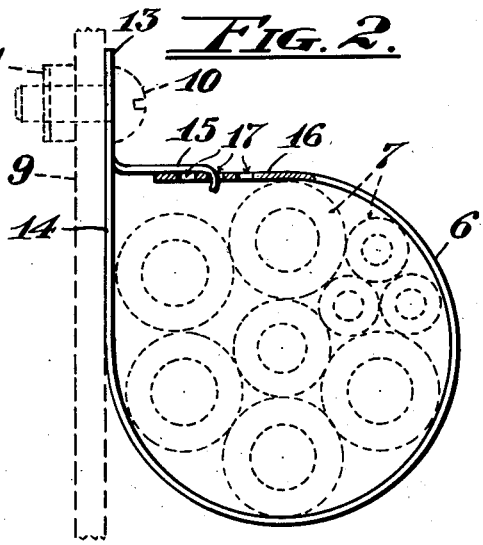
Fig. 2 is a side elevation of the clip as installed with a portion broken away and shown in section.
Figure 4:
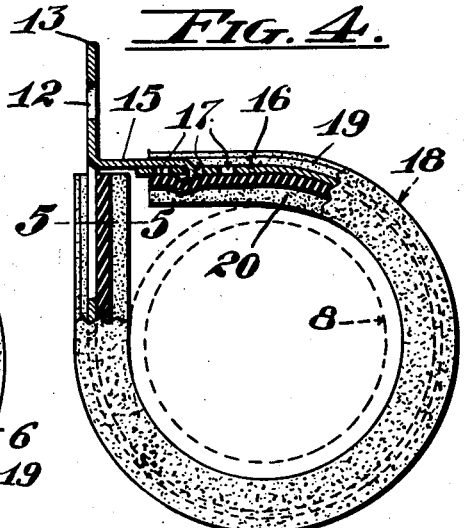
Fig. 4 is a side elevational and part sectional view of the cushioned clip as when locked around an object to be supported.

With particular reference to the accompanying drawing, it will be seen that my invention resides in the provision of a clip made of a spring metal strap formed into an open loop 6 for embracing wires 7, shown in dashed lines in Figs. 1 and 2 or a conduit 8 shown in dashed lines in Fig. 4, in order to support the same on a structural member or support 9 as shown in dashed lines in Fig. 2. A fastening 10 and a nut 11 are employed to secure the clip to the support, the fastening 10 being inserted through an opening 12 formed in an outwardly extended end 13 of the strap. This end is substantially straight and coplanar with a straight portion 14 of the loop so that with said straight portion there is provided a long and effective seat against the support.

In accordance with my invention a tongue-like hook 15 is struck out from the straight portion 14 so as to extend toward the other end 16 of the loop, said hook extending substantially at right angles to the end 13 and portion 14, from a point which is the juncture of the latter with end 13, so as to lie inwardly spaced from the opening 12 whereby the fastening 10 may be installed, manipulated and removed as desired and moreover, the loop may be locked in closed position and released and opened when the clip is fastened in place.

The shank of the hook 15 is relatively long and the bill is turned inwardly so that when the end 16 is brought underneath the hook as in closing and clamping the loop around the wires or the conduit the hook may be hooked into one of a series of openings or slots 17 in the end 16 thereby locking the loop in clamped relation to the wires or conduit. The several openings 17 spaced apart as here shown make it possible to effectively clamp and support wire bundles and conduits of different diameters.

One of the advantages of the hook 15 and end 16 as here constructed and arranged is that in the operation of closing the loop by forcing end 16 under the hook 15, the locking of the loop in conduit or wire embracing position will be substantially automatically effected upon releasing end 16 which will then spring outwardly so that the bill of the hook will extend through the selected one of the several openings 17, the length of the body portion of the hook being sufficient to overlie a plurality of said openings.

It should be noted that the hook 15 becomes a part of the conduit or wire embracing loop when the end 16 is hooked thereto as shown in Figs. 2 and 4 and that as it is relatively long and resilient and overlies the end 16, a tensioned engagement of said end and the hook is brought about and said end is securely held against being accidentally unhooked, any internal expanding force on the loop tending to force the end 16 and hook 15 closer together. However, the end 16 may be readily released by depressing it and pushing it slightly forwardly toward the portion 14 free of the bill of the hook.

Figure 3:
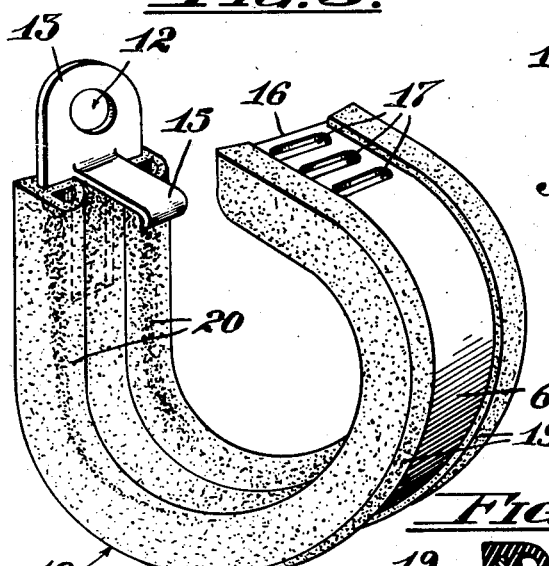
Fig. 3 is a perspective view of the clip with a cushion mounted thereon.
Figure 5:
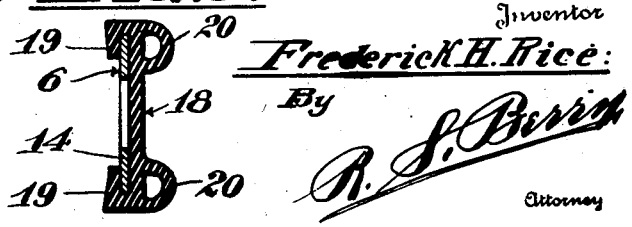
Fig. 5 is a cross sectional view taken on the line 5—5 of Fig. 4.

As shown in Figs. 3, 4 and 5, I may use a cushion strip 18 of rubber or the like having rebent flanges 19 to hold it on the loop and provided with tubular cushioning ribs 20 as seats for the wires or conduit. As here shown the hook 15 is narrower than the space between the flanges 19 so that it will lie therebetween in hooked engagement with the end 16 as shown in Fig. 4. The resiliency of this cushion tends to force more firmly against the hook that end of the clip which is furnished with the locking openings 17.

It is important to note that the hook 15 is struck outwardly from the portion 14 intermediate the longitudinal edges thereof and its formation requires no extra material in an ordinary flat strap metal loop or no folds or bends, whereby the clip hereof requires less material and is lighter than clips that have rebent portions or marginal extension of a rectangular and flat strap. Moreover, this hook having a long flat shank affords an effective seat for end 16 which contacts under tension the inner surface of the shank. Thus the shank of the hook and the end 16 overlapped thereby, bridge the gap of and close the loop as a strong doubled loop portion preventing accidental opening of the loop, and making it possible to make the hook of less than half the width of the strap with the side or longitudinal edges of the hook equidistantly inwardly spaced from the corresponding adjacent margins of the portion 14 of the strap.

While I have shown and described a specific embodiment of my invention I do not limit myself to the exact details of construction set forth, and the invention embraces such changes, modifications and equivalents of the parts and their formation and arrangement as come within the purview of the appended claim.

I claim:

In a clip for supporting wires for a conduit, a resilient strap formed into an open loop for embracing wires or a conduit and having one end extended beyond the other end and provided with an opening for reception of a fastening for securing the clip to a support, and a hook struck outwardly from the strap at a point spaced inwardly from the opening and extending toward said other end with its bill turned inwardly toward the space within the loop, said other end having a hook receiving opening therein being movable to a position to have tensioned contact with the inner surface of the shank of the hook and to hook the bill of the hook in said hook receiving opening, and a resilient cushioning strip mounted in said loop and having rebent flanges overlying the outer surface of the loop and having a pair of hollow ribs extending along the marginal edges thereof and on the inner side of the loop.

FREDERICK HENRY RICE.

REFERENCES CITED

The following references are of record in the file of this patent:

UNITED STATES PATENTS

| Number | Name | Date |
|---|---|---|
| 1,246,325 | Rohmer | Nov. 13, 1917 |
| 2,338,006 | Morehouse | Dec. 28, 1943 |
| 2,340,713 | Tinnerman | Feb. 1, 1944 |
| 2,352,856 | Morehouse | July 4, 1944 |